Patented Apr. 29, 1952

2,594,293

UNITED STATES PATENT OFFICE 2,594,293

ACRYLONITRILE PROTEIN DERIVATIVES

John C. Cowan, Peoria, Cyril D. Evans, Peoria Heights, and Leonard L. McKinney, Peoria, Ill., assignors to the United States of America as represented by the Secretary of Agriculture No Drawing. Application October 31, 1947, Serial No. 783,428

3 Claims. (Cl. 260—8)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to protein derivatives and their production, and particularly to the reaction products of proteins and acrylonitrile.

Natural proteins, such as globulins, prolamines, and phosphoproteins, have potential use in coatings, plastics, adhesives, synthetic fibers, films, and the like. They have certain disadvantages, however, that limit their practical applications. Their alkaline dispersions containing formaldehyde tend to be unstable and form gels. Products formed from them have disadvantageous water-absorption characteristics and low water resistance.

The present invention has among its objects the provision of protein derivatives formed by the reaction of proteins and acrylonitrile, which derivatives retain substantially all of the desirable characteristics of the natural proteins, but which, when dispersed in aqueous alkaline mediums have a markedly decreased tendency to gel in the presence of formaldehyde, and in which products formed from the derivatives have markedly increased water resistance.

The enhanced properties of the protein derivatives of this invention broaden the uses of the proteins. For example, the manufacture of protein paper coatings, adhesives, water paints and leather dressings of improved water resistance is made possible. The dispersibility of the protein derivatives is substantially identical with that of the original protein, and this, coupled with the fact that stable dispersions containing formaldehyde are obtained, effects a more economical production of fibers with improved wet strength. Furthermore, formaldehyde may be reacted with the new derivatives without imparting brittleness.

In general, according to the present invention, a natural protein, such as zein, casein, soybean protein, and the like, is reacted with the acrylonitrile in the presence of alkaline agents. Under these conditions, the acrylonitrile reacts with the protein molecule to form chemical entities not heretofore produced.

Although the protein molecule is easily degraded by hydrolysis or the like under most circumstances, the reaction described herein may be effected without degradation. Even in ranges of pH as high as 13, acrylonitrile may be reacted with proteins without undue hydrolysis. In general, the reaction is carried out in the presence of an alkaline agent which may be the alkaline medium of a protein dispersion or may be an agency such as trimethylbenzyl ammonium hydroxide (Triton B), or it may be both. Instead of Triton B, similar quaternary ammonium hydroxides may be used. The acrylonitrile is added to the alkaline agent containing the protein and the reaction mixture is allowed to stand for several hours. If the reaction is carried out on an alkaline protein dispersion, the product may be precipitated with acid after completion of the reaction in substantially the same manner as unreacted proteins. In the case of producing protein fibers or the like, after completion of the reaction, the reaction product which retains its physical form is then rinsed with water and is preferably washed with acetone.

The amount of acrylonitrile entering into reaction varies with the conditions and with the protein involved, as well as the particular physical form of the protein. In general, from 2 to 15 percent of acrylonitrile based on the weight of the protein may be reacted.

The appearance of the isolated protein derivative is substantially the same as the original protein. There is no appreciable color change or alteration in general appearance. When the reaction is carried out using a protein dispersion, the curd precipitated with acid after completion of the reaction is considerably more compact than the original protein.

If formaldehyde is added to alkaline dispersions of moderate concentration of the acrylonitrile-protein reaction product of this invention, no gel is formed, even after long standing. This indicates that free amino groups of the protein molecule have been blocked off. If formaldehyde is added to a 10 to 14 percent dispersion of unreacted protein, gelation is practically immediate, while samples of the derivatives of this invention treated correspondingly stood at room temperatures for periods as long as two months with no increase in viscosity.

The exact chemical mechanism of the reaction is not known. However, it is indicated that acrylonitrile blocks off the free amino groups, thus preventing the formation of a 3-dimensional polymer when formaldehyde is added.

It has also been found that the water resistance properties of the acrylonitrile-protein reaction product can be further enhanced by reacting it subsequently with formaldehyde. This seems to indicate that formaldehyde reacts with other groups in the protein molecule than those with which acrylonitrile reacts. However, such may not be the case, since it is possible that formaldehyde reacts with new groups formed by the reaction of acrylonitrile with the protein. Washing exhaustively with acetone does not alter the chemical or physical properties of the product.

The invention is more specifically exhibited in the following examples:

EXAMPLE I

Twenty-five grams of alkali extracted soybean protein was slurried with 300 cc. of water and allowed to swell; 100 cc. of 1 percent NaOH solution was added with stirring to give a clear dispersion having a pH of 9.1. The dispersion was transferred to a closed container and 10 cc. of acrylonitrile added. After shaking, the reaction was allowed to proceed for 24 hours at room temperature. The acrylonitrile-protein product was then precipitated by adding acetic acid to give a pH of 4.4. The precipitate was recovered and washed thoroughly with ethyl alcohol and acetone to insure removal of excess acrylonitrile and any acrylonitrile polymer that might have been formed.

The dried product had the appearance of the original protein. However, analysis showed a content of 5 percent acrylonitrile. A plastic disc molded from this product gave a water absorption in 24 hours of 57 percent, while a disc molded from a corresponding blank not treated with acrylonitrile gave a water absorption of 82 percent.

EXAMPLE II

Twenty-five grams of rennet casein was swelled with 240 cc. of water. Ten cc. of 10 percent sodium hydroxide solution was added with stirring to give a clear dispersion having a pH of 11.1. The protein solution was transferred to a closed container and 10 cc. of acrylonitrile added. The dispersion was allowed to set for 17 hours at room temperature and then acetic acid added to give a pH of 4.5 to precipitate the product. The precipitate was thoroughly washed with alcohol and acetone.

Nitrogen analysis indicated that 14.6 percent acrylonitrile had reacted with the original casein. A water clear alkaline dispersion containing 10.7 percent of this product remained stable without change in viscosity when formaldehyde was added. An untreated blank sample of a corresponding dispersion gelled immediately upon addition of formaldehyde.

A plastic disc molded from this product gave a 24 hour water absorption of 32 percent while a corresponding blank sample disc absorbed 153 percent. The plastic disc from the blank sample warped and cracked badly upon drying after the water absorption test, while the acrylonitrile product retained its shape and dried to a water white transparent plastic. This disc was then placed in a 5 percent formaldehyde solution for one week at which time it was removed and air dried. A 24 hour water absorption was then found to be 17.5 percent, indicating that formaldehyde reacted with the acrylonitrile-protein product to further increase its water-resistance properties.

Plastic flow tests were made on a Rossi-Peakes flowtester using 98° C. and 700 p. s. i. The results were as follows:

Untreated casein, 0.79 inch
Acrylonitrile-casein, 0.47 inch

Since water was used as a plasticizer, the reduction in plastic flow is interpreted as an increase in water-resistance properties.

The following table summarizes similar examples, the reactions being at room temperature:

Table 1

| Example | Protein used | pH of Reaction | | Catalyst or dispersing agent | Time of reaction (hours) | Acrylonitrile reacted mg./g. protein |
|---|---|---|---|---|---|---|
| | | initial | final | | | |
| III | Lime extracted soybean protein. | 11.2 | | Triton B | 18 | 92 |
| IV | SO₂ extracted soybean protein. | 9.5 | 7.7 | NaOH | 24 | 24 |
| V | HCl casein | 9.0 | 7.0 | NaOH | 17 | 119 |
| VI | Zein | 12.2 | | NaOH | 24 | 31 |
| VII | do | | | NaOH+Triton B | 60 | 43 |
| VIII | Zein, same as VII, but extracted 14 hrs. with acetone. | | | | | 44 |

The following table summarizes comparative water absorption data, made on various molded samples, the figures being percent water absorption:

Table 2

| Sample | Protein used | Blank | Acrylonitrile Product | Acrylonitrile Product and HCHO | HCHO alone |
|---|---|---|---|---|---|
| 1 | NaOH extracted soybean protein. | 82 | 57 | | |
| 2 | SO₂ extracted soybean protein. | 60 | 45 | | |
| 3 | Rennet casein | 153 | 32 | 17.5 | |
| 4 | HCl casein | | | 9.8 | 17.5 |
| 5 | Zein | 44 | 14 | | |

Sample 5 above did not blush, nor discolor upon immersion in water.

Acrylonitrile was also reacted with zein fibers and soybean fibers under conditions substantially the same as those described above, as more specifically set forth in the following examples. In the case of fibers, the time required for completion of the reaction is usually greater.

EXAMPLE IX

The reaction of acrylonitrile on zein fibers was investigated with fibers which were in different stages of processing. These fibers were spun and processed as described in the copending application, Serial No. 528,479, of Evans, Ofelt and Smith, filed March 28, 1944, now U. S. Patent 2,521,704. A sample of zein fiber was taken from the spinning machine before precuring and analyzed 15.78 percent nitrogen. Another sample removed after precuring and washing analyzed 15.85 percent nitrogen.

These samples were then treated with aqueous 5 percent acrylonitrile solution for 24 hours at room temperature. The reaction was catalyzed by the addition of Triton B to a pH of 12.5. A blank to the latter sample was carried along simultaneously in a solution containing everything except the acrylonitrile.

The reacted samples analyzed 16.62 percent and 16.30 percent nitrogen, respectively, while the blank sample (no acrylonitrile added) analyzed 15.84 percent nitrogen showing that there was no hydrolysis or degradation of the protein during the course of the reaction. On the basis of nitrogen analysis, these samples showed, respectively, the addition of 86 mg. and 44 mg. acrylonitrile per gram of protein.

EXAMPLE X

A spinning dispersion containing acrylonitrile was prepared by suspending 1000 grams of zein in 5360 cc. of cold water. To this slurry was added slowly and with constant stirring 1330 cc. of 0.4 N sodium hydroxide. A clear, limpid solution resulted before the addition of all the alkali. To this solution, 335 cc. of acrylonitrile was added with stirring. After filtration and aging for 1 to 2 days, the dispersion had thickened and the reacted protein was suitable for extrusion. Spinning conditions and processing were performed as given in application Serial No. 528,479. The fibers obtained were strong, flexible and possessed good wet strength.

EXAMPLE XI

Fifteen grams of zein fiber was treated at room temperature in 300 cc. of a 5 percent solution of acrylonitrile (18.75 cc.) which also contained 10 cc. of Triton B. The pH at the beginning was 13.0, at the end of one hour 12.9, by the next morning it had dropped to 12.5, and at the end of 24 hours showed a further small drop.

One-half of the fiber was removed at the end of 24 hours, and the other half treated for 84 hours. Samples were thoroughly washed in water and then in several changes of acetone. A blank washed only in acetone was taken for analysis, as previous tests had shown that the effect of Triton B on the fiber was negligible even at such a high pH.

EXAMPLE XII

A 4-gram sample of soybean fiber was similarly treated at room temperature for 24 hours in a 5 percent acrylonitrile solution containing only 1 cc. of Triton B. The pH at the beginning was 12.1, after 1 hour was 11.2, by the next morning was 8.1, and at the end of 24 hours was 5.3. A blank sample was treated under similar conditions, but without the addition of acrylonitrile. Another blank for Kjeldahl analysis was taken but given no treatment except washing in water and in acetone.

The results of the above experiments are summarized as follows:

Table 3

| Example | Sample of fiber used | pH of Reaction initial | pH of Reaction final | Alkaline agent | Time of reaction (hours) | Acrylonitrile reacted mg./g. protein |
|---|---|---|---|---|---|---|
| IX | Zein, no precure | 12.5 |  | Triton B | 24 | 86 |
| IX | Zein precured | 12.5 |  | do | 24 | 44 |
| IX | Zein, blank | 12.5 |  | do | 24 | 0 |
| XI | Zein precured | 13.0 | 12.6 | do | 24 | 6 |
| XI | Zein precured | 13.0 |  | do | 84 | 31 |
| XII | Soybean | 12.1 | 5.3 | do | 24 | 29 |
| XII | Soybean, blank | 12.1 |  | do | 24 | 0 |

In the manufacture of the protein derivatives of this invention, the pH appears to be a governing factor, the ranges over which satisfactory results may be obtained being from 7.5 to 13.0, about from 9.0 to 13.0 being preferred. The reaction takes place satisfactorily at temperatures within the range of about from 20° to 40° C., room temperatures being preferred for convenience. The time of reaction may be quite rapid or may require several hours. For alkaline dispersions, satisfactory results are obtained within the period of about from 10 hours to 48 hours. For fibers and the like, in most cases a longer time is required, satisfactory results being obtained over ranges of about from 12 hours to 72 hours.

It is preferable to add the acrylonitrile by means of its aqueous solution. However, this method of adding the acrylonitrile is not essential. The amount of acrylonitrile may be within the range of about from 10 percent to 40 percent based on the protein weight.

Having thus described the invention, what is claimed is:

1. The method which comprises reacting a protein compound with acrylonitrile in aqueous alkaline dispersion to produce a modified protein compound, aging the dispersion until the viscosity of the dispersion increases to a degree suitable for spinning, and spinning the dispersion into fibers.

2. A process comprising reacting acrylonitrile with an alkaline dispersion of protein to produce a modified protein compound and subsequently adding formaldehyde to form a stable dispersion.

3. The method which comprises reacting a protein compound with acrylonitrile in aqueous alkaline dispersion to form a protein-acrylonitrile reaction product, aging the dispersion for a period of 1–2 days, thereby to cause an increase in viscosity of the dispersion sufficient to render it suitable for spinning, and wet spinning the dispersion into fibers.

JOHN C. COWAN.
CYRIL D. EVANS.
LEONARD L. McKINNEY.

REFERENCES CITED

The following references are of record in the file of this patent:

UNITED STATES PATENTS

| Number | Name | Date |
|---|---|---|
| 2,399,084 | Watson | Apr. 23, 1946 |
| 2,406,958 | McQueen | Sept. 3, 1946 |
| 2,562,534 | Coffman | July 31, 1951 |